US011778182B2

(12) United States Patent
Misra et al.

(10) Patent No.: US 11,778,182 B2
(45) Date of Patent: Oct. 3, 2023

(54) DEVICE FOR DECODING VIDEO DATA, DEVICE FOR ENCODING VIDEO DATA, AND METHOD FOR DECODING VIDEO DATA

(71) Applicant: Sharp Kabushiki Kaisha, Sakai (JP)

(72) Inventors: Kiran Mukesh Misra, Vancouver, WA (US); Weijia Zhu, Vancouver, WA (US); Christopher Andrew Segall, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/880,392

(22) Filed: Aug. 3, 2022

(65) Prior Publication Data

US 2022/0377329 A1    Nov. 24, 2022

Related U.S. Application Data

(63) Continuation of application No. 16/975,194, filed as application No. PCT/JP2019/006901 on Feb. 22, 2019, now Pat. No. 11,445,187.

(60) Provisional application No. 62/636,658, filed on Feb. 28, 2018.

(51) Int. Cl.
*H04N 19/119* (2014.01)
*H04N 19/157* (2014.01)
*H04N 19/174* (2014.01)
*H04N 19/96* (2014.01)

(52) U.S. Cl.
CPC ......... *H04N 19/119* (2014.11); *H04N 19/157* (2014.11); *H04N 19/174* (2014.11); *H04N 19/96* (2014.11)

(58) Field of Classification Search
CPC .. H04N 19/119; H04N 19/157; H04N 19/174; H04N 19/96; H04N 19/176; H04N 19/70; H04N 19/159
See application file for complete search history.

(56) References Cited

U.S. PATENT DOCUMENTS

| | | | |
|---|---|---|---|
| 11,445,187 B2* | 9/2022 | Misra | H04N 19/119 |
| 2012/0106622 A1* | 5/2012 | Huang | H04N 19/14 375/E7.026 |
| 2013/0343455 A1* | 12/2013 | Yamamoto | H04N 19/122 375/240.03 |
| 2016/0212446 A1* | 7/2016 | Liu | H04N 19/70 |
| 2018/0139441 A1* | 5/2018 | Choi | H04N 19/44 |
| 2020/0275117 A1* | 8/2020 | Jeong | H04N 19/513 |

OTHER PUBLICATIONS

Misra et al., "Systems and Methods for Partitioning Regions of a Picture for Video Coding Using Different Coding Unit Sizes", U.S. Appl. No. 16/975,194, filed Aug. 24, 2020.

* cited by examiner

*Primary Examiner* — Tat C Chio
(74) *Attorney, Agent, or Firm* — KEATING & BENNETT, LLP

(57) ABSTRACT

This invention relates to a method of coding video data. The method comprising: determining a largest coding unit size for a picture; determining whether a largest coding unit within a picture is an intra type largest coding unit; and applying a partitioning to the largest coding unit based on whether the largest coding unit is an intra type largest coding unit.

3 Claims, 12 Drawing Sheets

DEVICE FOR DECODING VIDEO DATA, DEVICE FOR ENCODING VIDEO DATA, AND METHOD FOR DECODING VIDEO DATA

CROSS REFERENCE

This Nonprovisional application claims priority under 35 U.S.C. § 119 on provisional Application No. 62/636,658 on Feb. 23, 2018, the entire contents of which are hereby incorporated by reference.

TECHNICAL FIELD

This disclosure relates to video coding and more particularly to techniques for partitioning a picture of video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describe the coding features that are under coordinated test model study by the JVET as potentially enhancing video coding technology beyond the capabilities of ITU-T H.265. It should be noted that the coding features of JEM 7 are implemented in JEM reference software. As used herein, the term JEM is used to collectively refer to algorithms included in JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of coding video data comprises determining a largest coding unit size for a picture, determining whether a largest coding unit within a picture is an intra type largest coding unit, and applying a partitioning to the largest coding unit based on whether the largest coding unit is an intra type largest coding unit.

DESCRIPTION OF EMBODIMENTS

Figure 1:
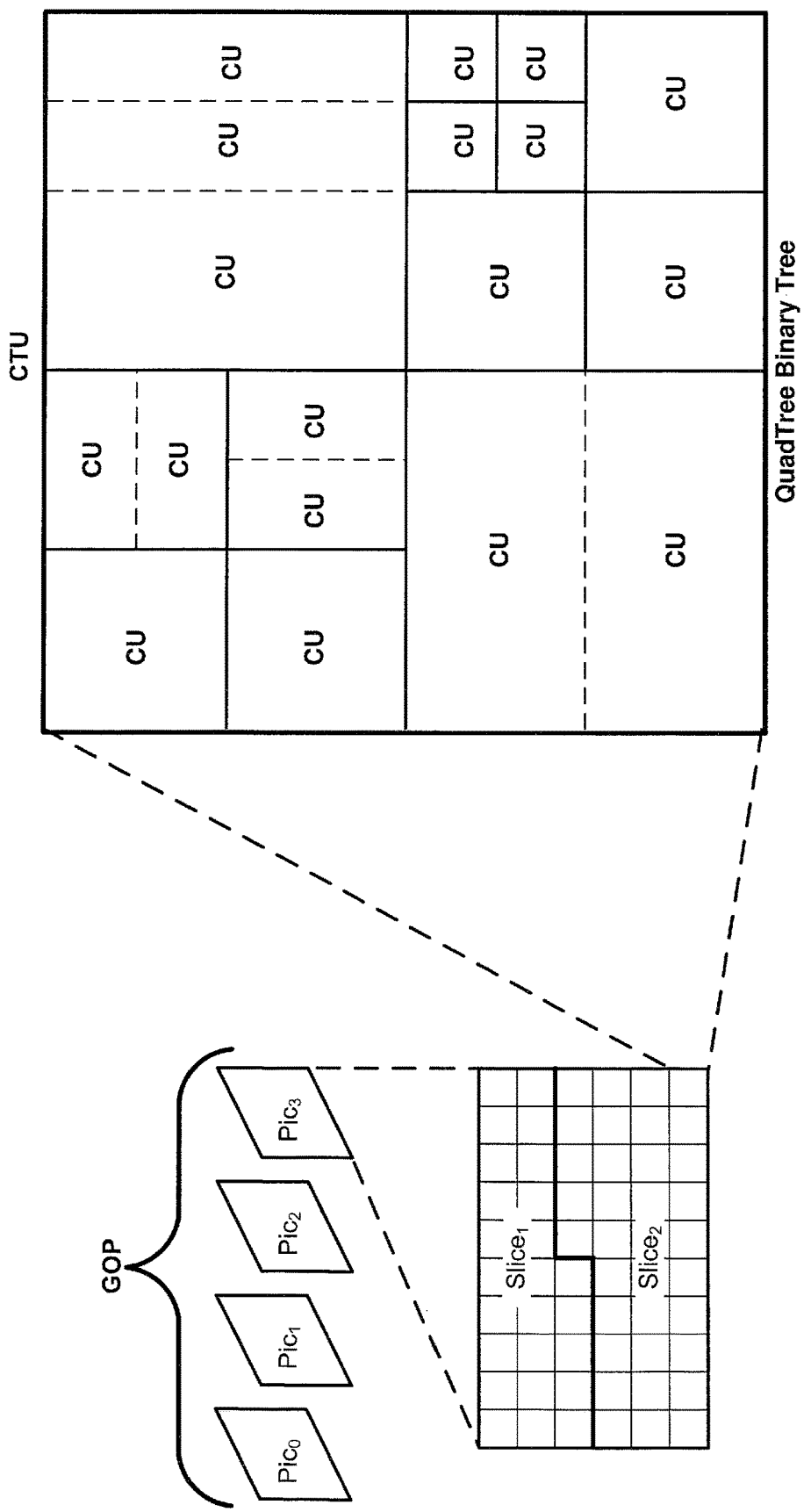
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for partitioning a picture of video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for partitioning video data for video coding comprises one or more processors configured to determine a largest coding unit size for a picture, determine whether a largest coding unit within a picture is an intra type largest coding unit, and apply a partitioning to the largest coding unit based on whether the largest coding unit is an intra type largest coding unit.

In one example, a non-transitory computer-readable storage medium comprises instructions stored thereon that, when executed, cause one or more processors of a device to determine a largest coding unit size for a picture, determine whether a largest coding unit within a picture is an intra type largest coding unit, and apply a partitioning to the largest coding unit based on whether the largest coding unit is an intra type largest coding unit.

In one example, an apparatus comprises means for determining a largest coding unit size for a picture, means for determining whether a largest coding unit within a picture is an intra type largest coding unit, and means for applying a partitioning to the largest coding unit based on whether the largest coding unit is an intra type largest coding unit.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel values and sample values are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes. Further, a node may refer to a leaf node in some instances and a root node in some instances.

ITU-T H.264 specifies a macroblock including 16×16 luma samples. That is, in ITU-T H.264, a picture is segmented into macroblocks. ITU-T H.265 specifies an analogous Coding Tree Unit (CTU) structure, which is also referred to as a largest coding unit (LCU). In ITU-T H.265, pictures are segmented into one or more slices, where each slice includes an integer number of CTUs arranged in a raster scan order. ITU-T H.265 further enables tiles of a picture to be identified, where tiles of a picture is rectangular and includes a integer number of CTUs. It should be noted that tiles of a picture are arranged in rows and columns and when tiles are enabled for a picture, ITU-T H.265 provides that one or both of the following conditions shall be fulfilled for each slice and tile: (i) all CTUs in a slice belong to the same tile and (ii) all CTUs in a tile belong to the same slice.

In ITU-T H.265, for a picture, an LCU size may be set as including 16×16, 32×32, or 64×64 luma samples. In ITU-T H.265, a sequence parameter set (SPS) includes an LCU size and a picture parameter set (PPS) references a corresponding active SPS and thus, an LCU size for a picture is set according to an active SPS. In ITU-T H.265, a CTU is composed of respective Coding Tree Blocks (CTB) for each component of video data (e.g., luma (Y) and chroma (Cb and Cr)). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure using QT split flags, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level. ITU-T H.265, further provides that each picture, and slices thereof, has an associated type based on which types of predictions are allowed for the picture. That is, slices included in a picture may have the following types: an intra (I) slice, which is a slice that is coded using intra predication only; a predictive (P) slice, which is a slice that is coded using intra prediction or using inter prediction with at most one motion vector and reference index to predict the sample values of each block; and a bi-predictive (B) slice which is a slice that is coded using intra prediction or using inter prediction with at most two motion vectors and reference indices to predict the sample values of each block. P slices and B slices may collectively be referred to as inter slices.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
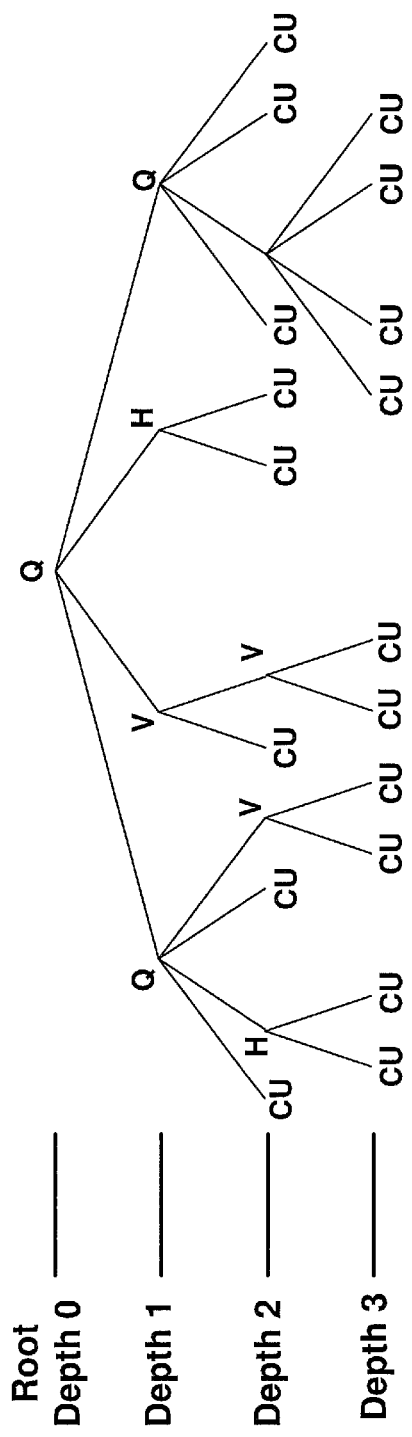
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs (or LCUs) in raster scan order and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1.

Figure 3:
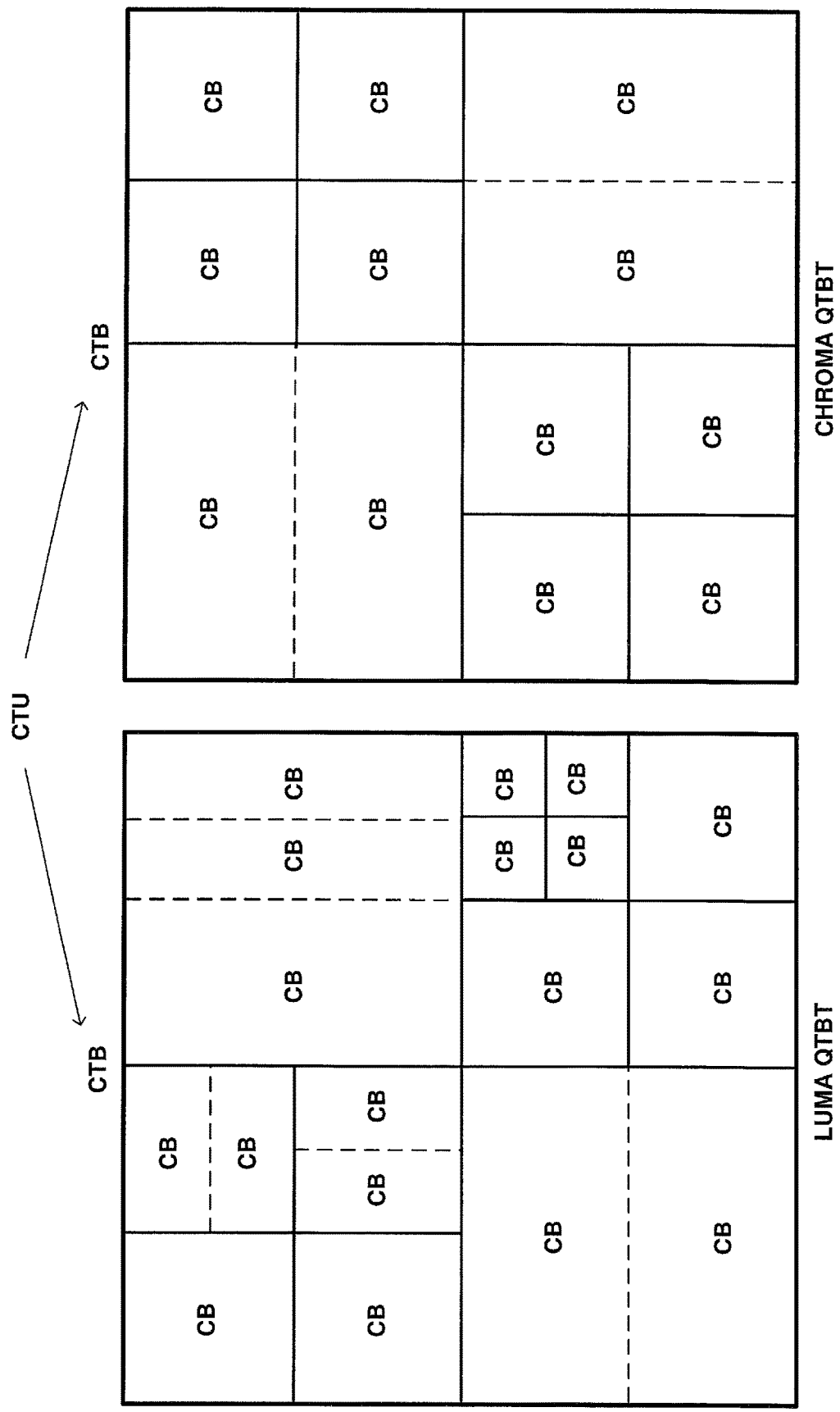
FIG. 3 is a conceptual diagram illustrating video component quad tree binary tree partitioning in accordance with one or more techniques of this disclosure.

In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0 (i.e., BT split mode coding tree=0), no binary splitting is indicated. When a BT split mode syntax element has a value of 1 (i.e., BT split mode coding tree=11), a vertical split mode is indicated. When a BT split mode syntax element has a value of 2 (i.e., BT split mode coding tree=10), a horizontal split mode is indicated. Further, BT splitting may be performed until a maximum BT depth is reached. As illustrated in FIG. 2, QT split flag syntax elements and BT split mode syntax elements are associated with a depth, where a depth of zero corresponds to a root of a QTBT and higher value depths correspond to subsequent depths beyond the root. Further, in JEM, luma and chroma components may have separate QTBT partitions. That is, in JEM luma and chroma components may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component are not required to and do not necessarily align with CBs of chroma components. Currently, in JEM independent QTBT structures are enabled for intra prediction slices.

It should be noted that JEM includes the following parameters for signaling of a QTBT tree:
CTU size: the root node size of a quadtree (e.g., 256×256, 128×128, 64×64, 32×32, 16×16 luma samples);
MinQTSize: the minimum allowed quadtree leaf node size (e.g., 16×16, 8×8 luma samples);
MaxBTSize: the maximum allowed binary tree root node size, i.e., the maximum size of a leaf quadtree node that may be partitioned by binary splitting (e.g., 64×64 luma samples);
MaxBTDepth: the maximum allowed binary tree depth, i.e., the lowest level at which binary splitting may occur, where the quadtree leaf node is the root (e.g., 3);
MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 4:
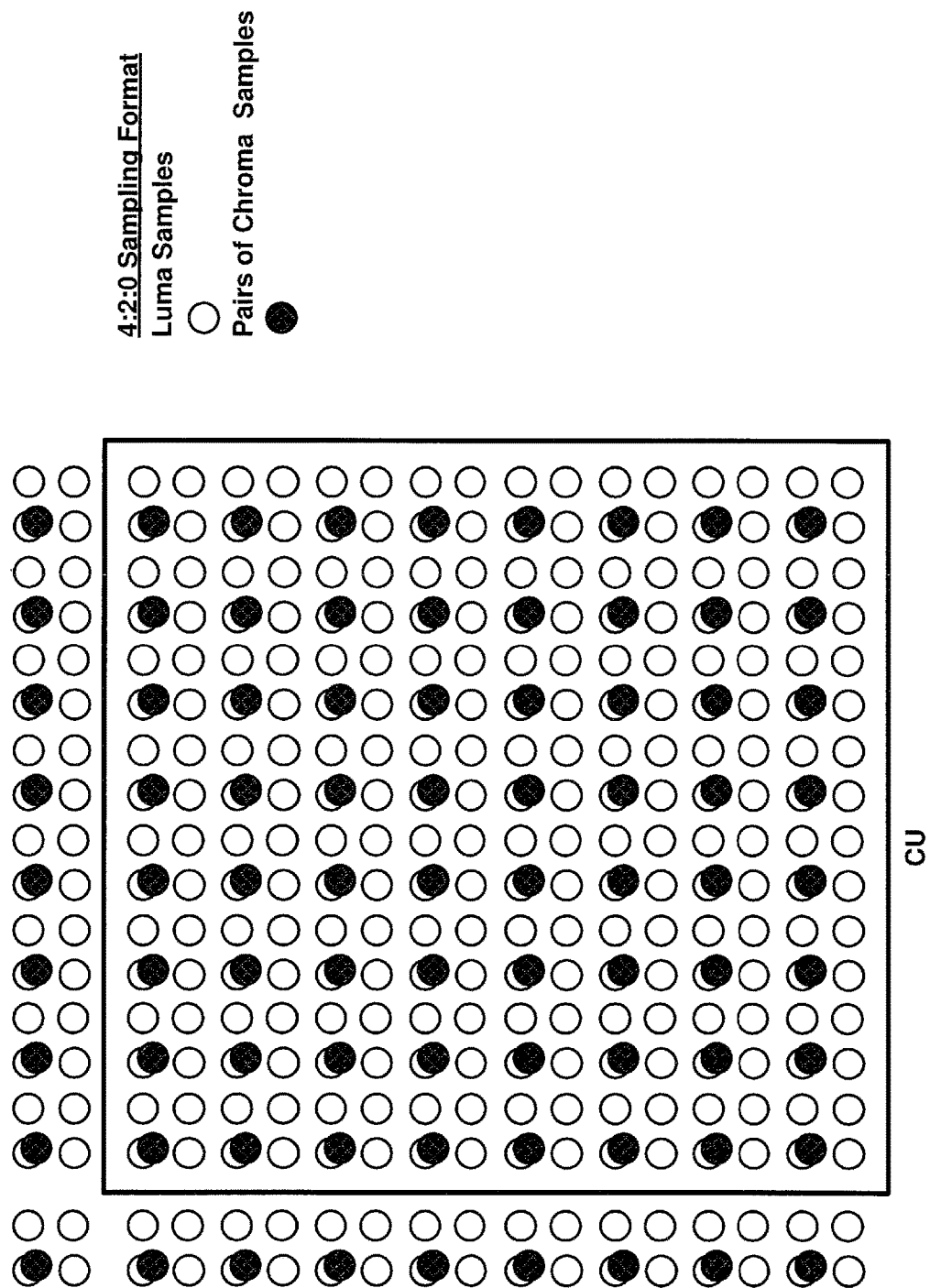
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
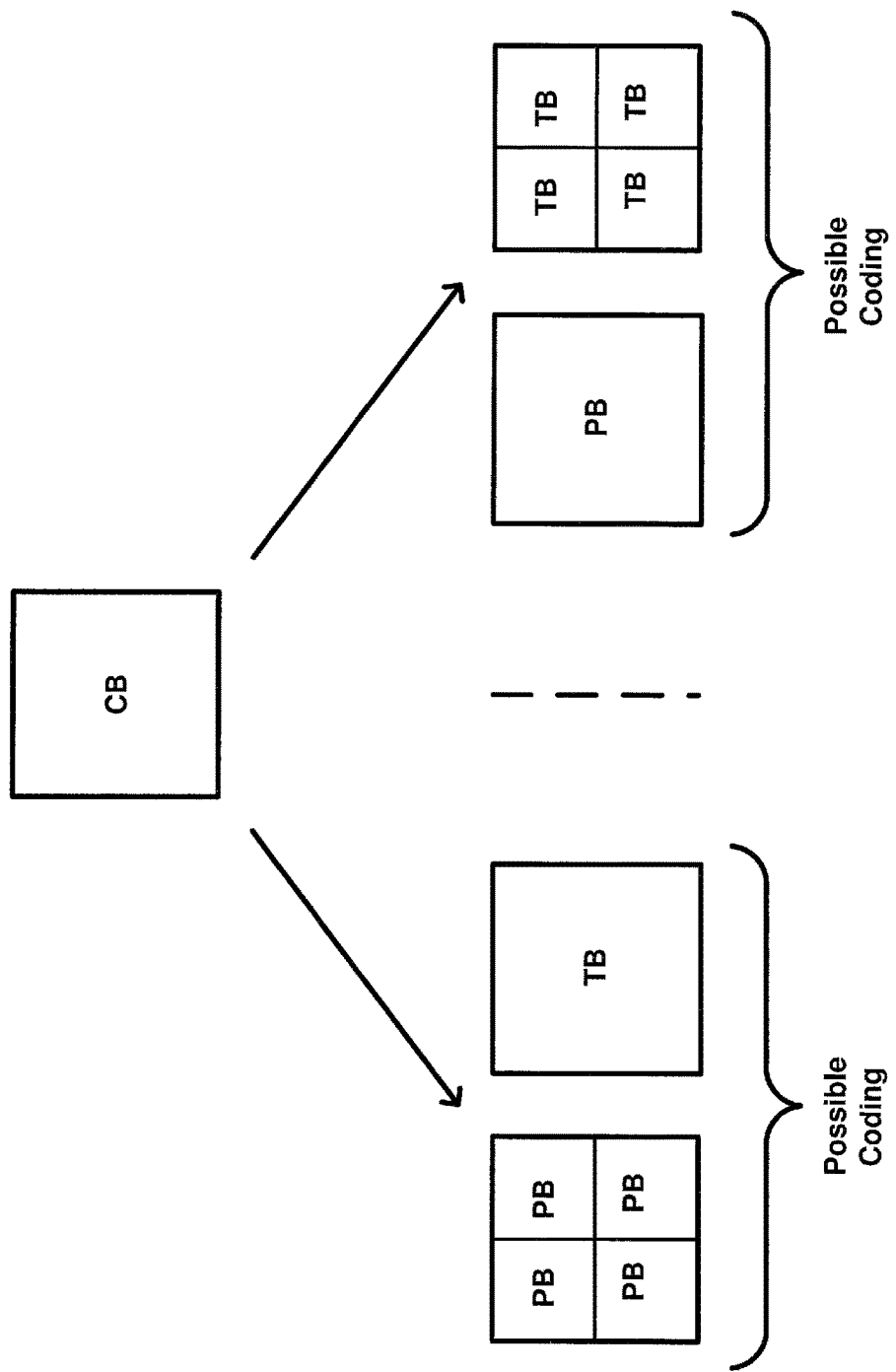
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization essentially scales transform coefficients in order to vary the amount of data required to represent a group of transform coefficients. Quantization may generally be described as including division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Figure 6A:
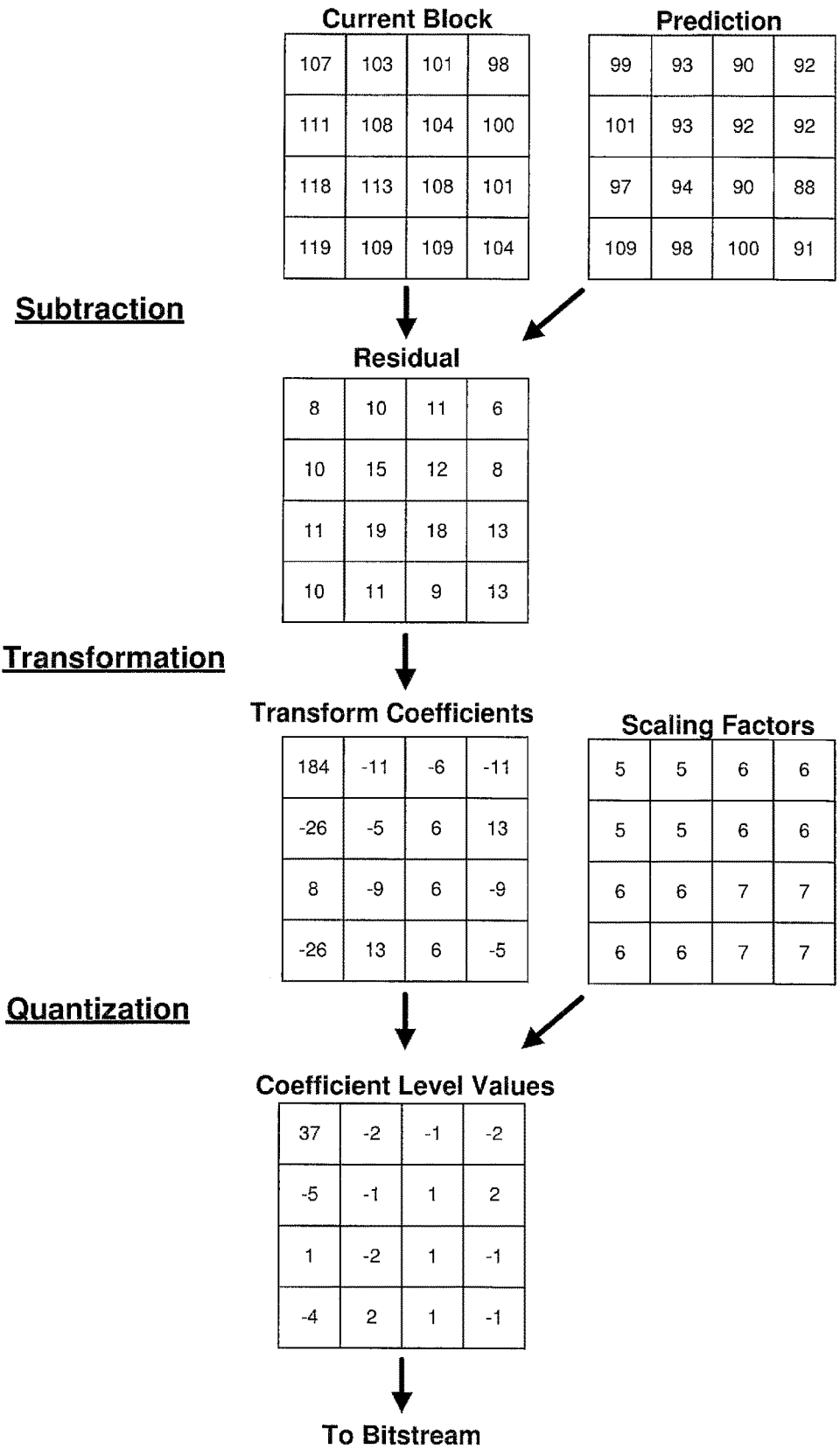
FIG. 6A. is a conceptual diagrams illustrating examples of coding a block of video data in accordance with one or more techniques of this disclosure.
Figure 6B:
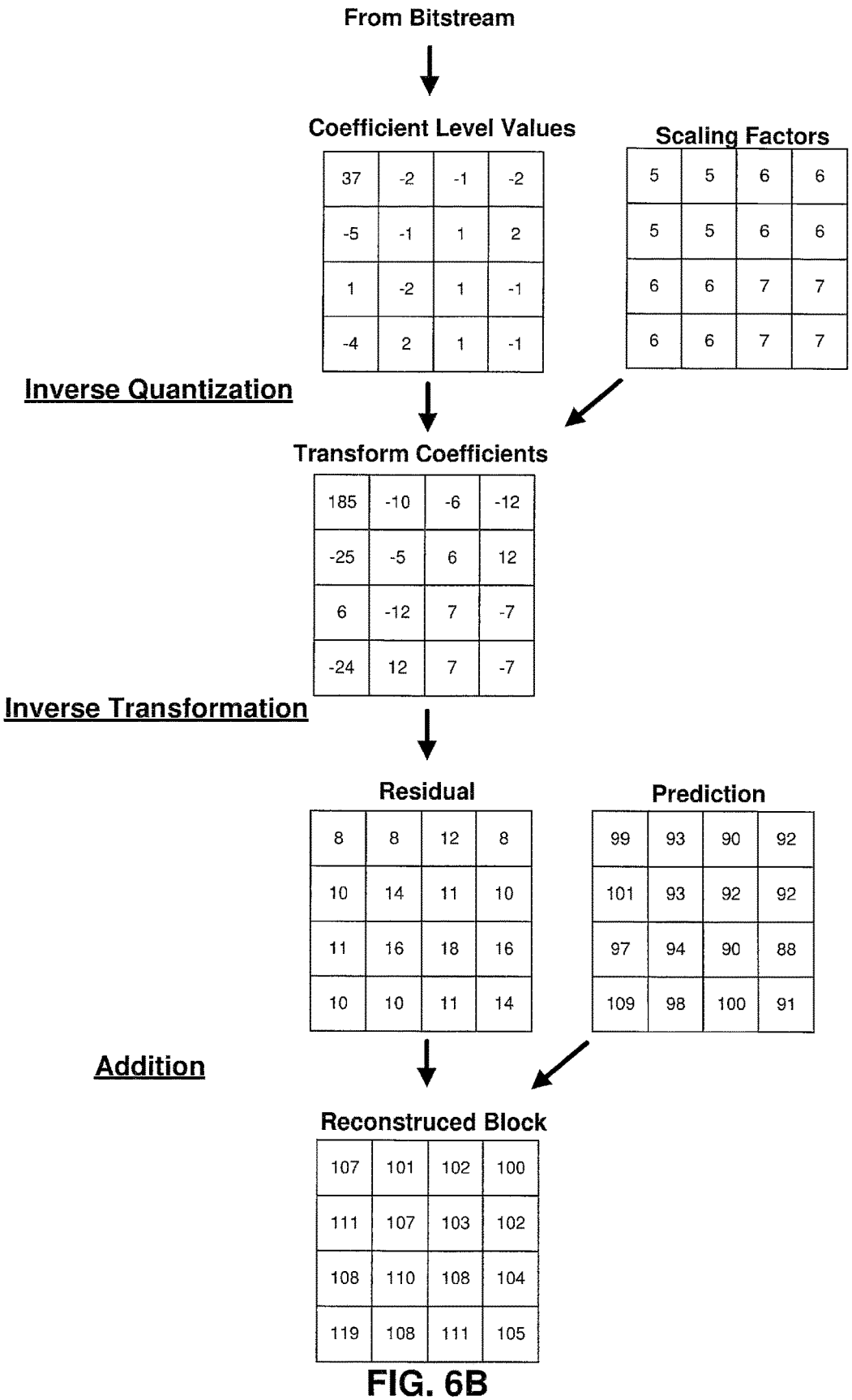
FIG. 6B. is a conceptual diagrams illustrating examples of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy.

However, the difference in sample values may be considered acceptable or imperceptible to a viewer of the reconstructed video. Further, as illustrated in FIGS. 6A-6B, scaling is performed using an array of scaling factors.

In ITU-T H.265, an array of scaling factors is generated by selecting a scaling matrix and multiplying each entry in the scaling matrix by a quantization scaling factor. In ITU-T H.265, a scaling matrix is selected based on a prediction mode and a color component, where scaling matrices of the following sizes are defined: 4×4, 8×8, 16×16, and 32×32. Thus, it should be noted that ITU-T H.265 does not define scaling matrices for sizes other than 4×4, 8×8, 16×16, and 32×32. In ITU-T H.265, the value of a quantization scaling factor, may be determined by a quantization parameter, QP. In ITU-T H.265, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a quantization parameter may be derived for each of luma (Y) and chroma (Cb and Cr) components.

As illustrated in FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and/or minimize artifacts introduced by the video coding process. Such modifications may general be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output.

As described above, intra prediction data or inter prediction data may associate an area of a picture (e.g., a PB or a CB) with corresponding reference samples. For intra prediction coding, an intra prediction mode may specify how reference samples adjacent to a video block (e.g., an adjacent left column to a CU and an adjacent above row to the CU of reference samples) are used to generate a prediction. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

In general, the effectiveness of intra prediction decreases as block size increases. That is, for example, as the distance of reference samples (e.g., reference samples in column and row adjacent to a CU) from a sample under consideration in a PU (or CB in JEM) increases, the effectiveness of using intra prediction to code the PU decreases. Based on the premise that the effectiveness of intra prediction decreases as block size increases, regions of a picture using intra prediction may be more efficiently coded using relatively smaller sized LCUs (e.g., 32×32 vs. 128×128). As described above, in ITU-T H.265, a picture may include intra slices and inter slices. However, as described above, in ITU-T H.265, a LCU size is set for a picture by having a picture reference an active SPS and as such, ITU-T H.265 (and further JEM) does not provide a mechanism for efficiently modulating LCU size on a picture-by-picture basis, a slice-by-slice basis or more generally, within a picture on a region-by-region basis. According to the techniques described herein, smaller effective LCU sizes may be realized for regions of picture using intra prediction.

Figure 7:
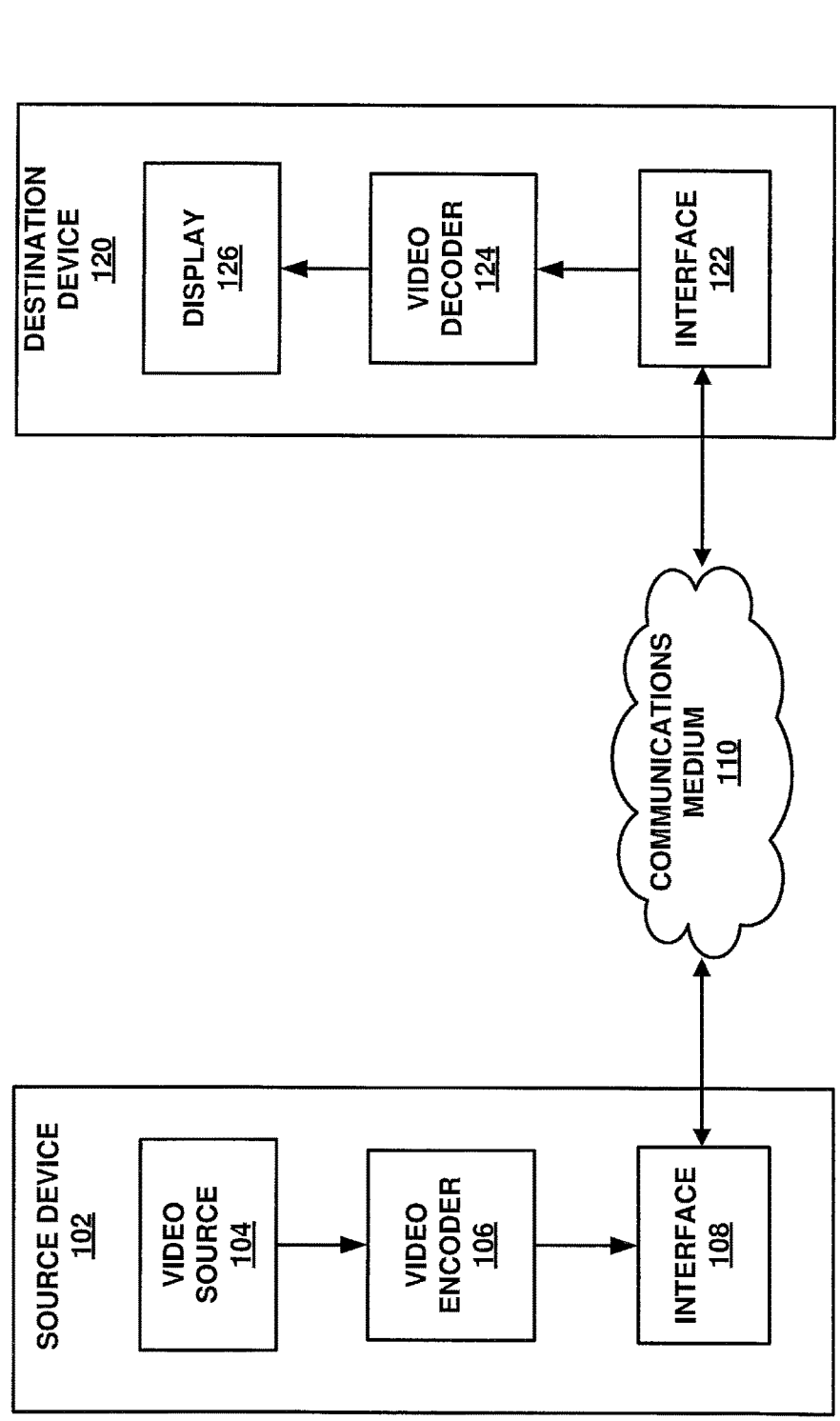
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may perform video coding using different CTU or LCU sizes according to one or more techniques of this disclosure. As illustrated in FIG. 7, system 100 includes source device 102, communications medium 110, and destination device 120. In the example illustrated in FIG. 7, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 7, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 7, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
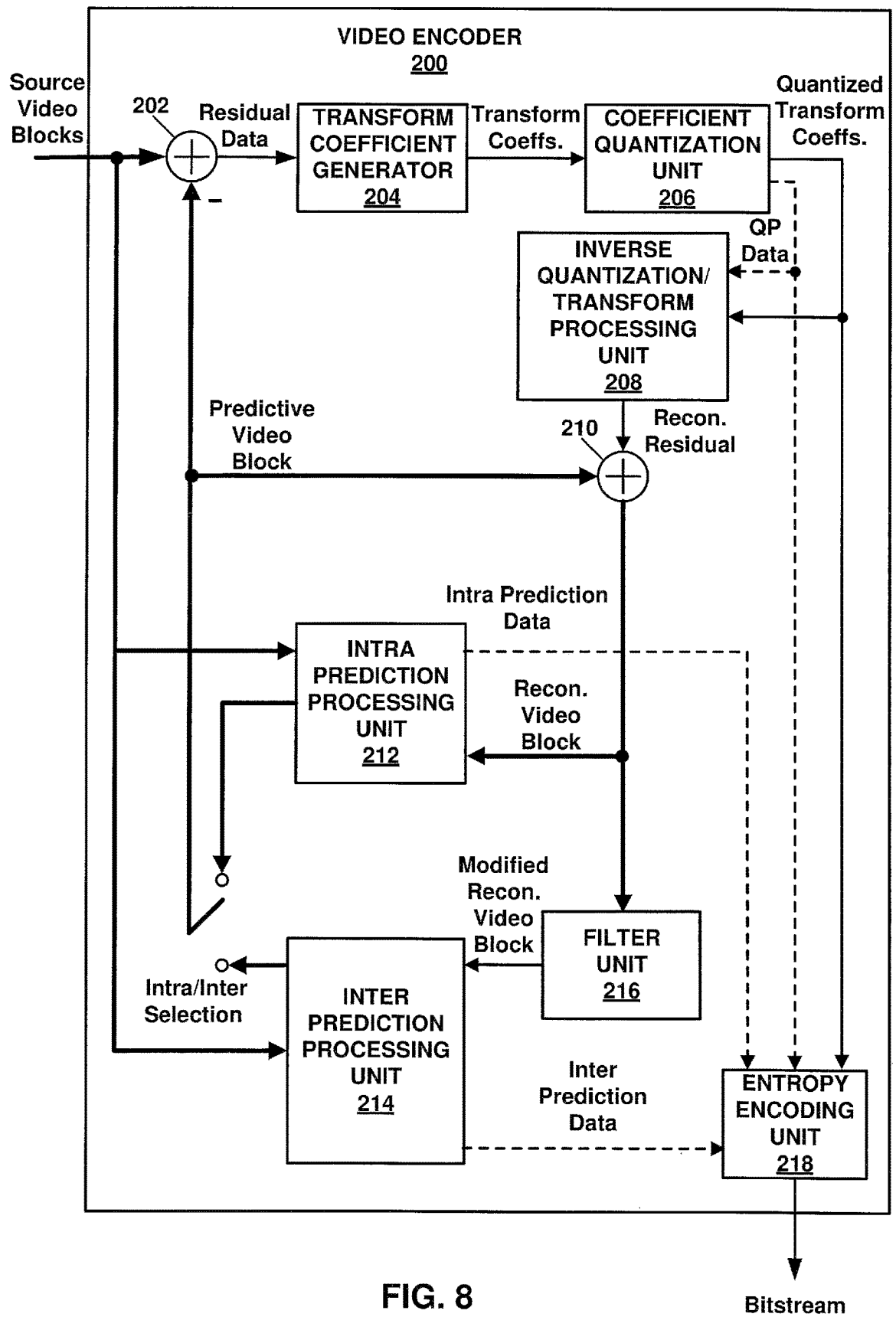
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that have been or need to be divided according to a coding structure. For example, source video data may include macroblocks, CTUs, CBs, sub-divisions thereof, and/or another equivalent coding unit and/or regions of a picture that need to be divided into macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/ transform processing unit 208, summer 210, intra prediction processing unit 212, inter prediction processing unit 214, filter unit 216, and entropy encoding unit 218.

As described above, regions of a picture using intra prediction may be more efficiently coded using relatively smaller sized LCUs. In one example, video encoder 200 may be configured efficiently modulate an LCU size on a picture-by-picture basis. For example, in one example, video encoder 200 may be configured to signal a LCU size in a picture parameter set instead of a SPS. For example, in one example, according to the techniques of this disclosure, syntax elements log 2_min_luma_coding_block_size_minus3 and log 2_diff_max_min_luma_coding_block_size, which are included in the SPS in ITU-T H.265, or equivalents thereof, may be included in a picture parameter set. In one example, a slice header may refer to a picture parameter set in order to indicate the LCU size for the slice. In one example, syntax elements log 2_min_luma_coding_block_size_minus3 and log 2_diff_max_min_luma_coding_block_size, or equivalents thereof, may be included in a slice header. It should be noted that in some cases, LCU sizes may be limited such that all slices in a picture have a common LCU size. However, as described in further detail below, according to the techniques described herein, in some examples, slices and/or arbitrary regions of a picture may have different effective LCU sizes and/or shapes based on one or more inference rules and/or conditionally signaled syntax elements.

As described above, ITU-T H.265, further provides that each picture, and slices thereof, has a type based on which types of predictions are enabled. In one example, an LCU size for a picture may be inferred based on a picture type. That is, in one example, instead of including syntax elements log 2_min_luma_coding_block_size_minus3 and log 2_diff_max_min_luma_coding_block_size in an SPS, values thereof may be inferred based on a picture type value, e.g., a picture type value indicated by syntax element pic_type in ITU-T H.265 or indicated by slice_type associated with a picture. For example, for inter type pictures, the LCU size may be 128×128 and for intra type pictures, the LCU size may be 32×32. In one example, LCU size values that are inferred based on a picture type may be signaled in an SPS. For example, an SPS may include respective LCU size values to be inferred for intra and inter picture types.

In one example, video encoder 200 may be configured to determine a so-called optimal (e.g., optimal based on a bit-rate constraint) LCU size for a picture. For example, video encoder 200 may be configured to use multi-pass encoding to determine a LCU size that maximizes quality at a threshold bit-rate. In one example, video encoder 200 (or a video decoder) may be configured to derive an LCU for a current picture based on information corresponding to previous pictures. In one example, an LCU size may be signaled for the first picture in a sequence and for each subsequent picture in the sequence, the LCU size may be determined (or adjusted) based on information corresponding to previous pictures. In one example, block size information of CUs (e.g., average width W, average height H, average number of samples per block W*H, etc. of CUs included in a picture) of the previous pictures (or one or more slices thereof) may be used to determine the LCU size of the current picture. In one example, information regarding the QT and BT depths used to partition previous pictures (or one or more slices thereof) may be used to determine the LCU size of the current picture. For example, if a relative high percentage of LCUs in a previous picture are further partitioned using at least two levels of QT splitting (e.g., at depth 0 and depth 1), the LCU size may be decreased for a current picture.

Figure 9:
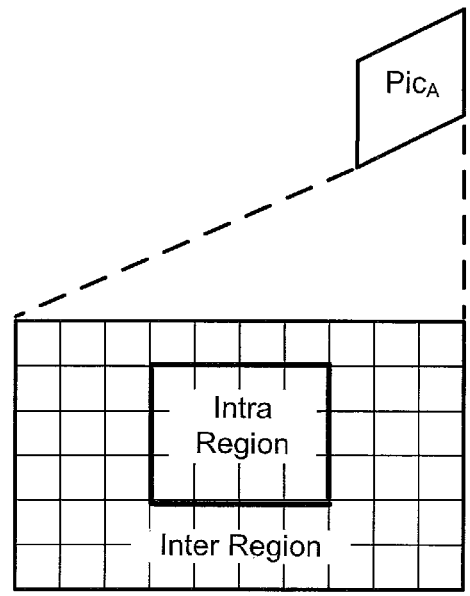
FIG. 9 is a conceptual diagram illustrating coding regions of a picture in accordance with one or more techniques of this disclosure.
Figure 10:
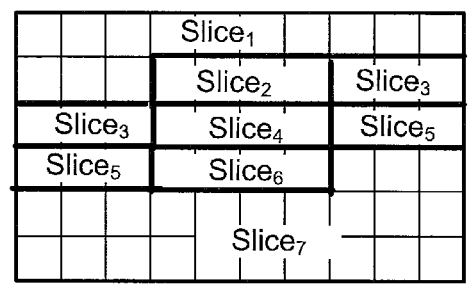
FIG. 10 is a conceptual diagram illustrating partitioning a picture into slices in accordance with one or more techniques of this disclosure.
Figure 11:
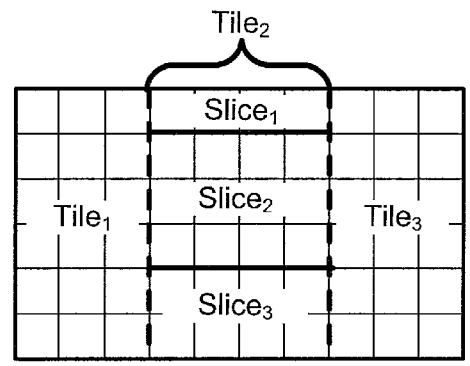
FIG. 11 is a conceptual diagram illustrating partitioning a picture into slices and tiles in accordance with one or more techniques of this disclosure.

As described in above, according to the techniques described herein, in some examples, slices and/or arbitrary regions of a picture may have different effective LCU sizes and/or shapes based on one or more inference rules and/or conditionally signaled syntax elements. FIG. 9 is a conceptual diagram illustrating an example of picture, PicA included an intra region and an inter region. In the example illustrated in FIG. 9, the intra region is intended to be coded using only intra prediction techniques and the inter region is intended to be coded using intra and inter prediction techniques. In one example, video encoder 200 may be configured to encode intra region and inter region using different effective LCU sizes and shapes. As described above, in ITU-T H.265, pictures are segmented into one or more slices, where each slice includes an integer number of CTUs arranged in a raster scan order and ITU-T H.265 further enables tiles of a picture to be identified. Further, as described above, ITU-T H.265 enables a slice to be identified as a I slice, a P slice, or a B slice. In one example, video encoder 200 may be configured to partition a PicA such that the intra region is contained in intra slices. FIG. 10 and FIG. 11 illustrate examples of containing the intra region in PicA in intra slices based on slice and tile structures provided in ITU-T H.265. That is, in FIG. 10, Slice2, Slice4, and Slice6 are encoded as intra slices and Slice1, Slice3, Slice5, and Slice7 and encoded as inter slices. In FIG. 11, in Tile2, Slice2 is encoded as an intra slice and Slice1, and Slice3 are encoded as inter slices.

As described above, in ITU-T H.265, a QT is signaled by signaling QT split flags and in JEM, a QTBT is signaled by signaling QT split flag and BT split mode syntax elements. In one example, video encoder 200 may be configured such that values of QT split flags and/or BT split mode syntax elements are inferred for intra slices. In this manner, by containing intra regions in intra slices and inferring values of QT split flags and/or BT split mode syntax elements, video encoder 200 may encode arbitrary regions of a picture (e.g., regions using only intra prediction) using different effective LCU sizes and/or shapes. In one example, video encoder 200 may be configured to signal an LCU size for a picture, for example using the SPS as provided in ITU-T H.265 or using a picture parameter set. Further, video encoder 200 may be configured to enable the LCU size for a picture to be determined at the picture level according to the techniques above. In one example, once an LCU size is determined at a picture level, an inference rule may be applied and/or syntax elements may be conditionally present at the LCU level, such that the picture level LCU is split in the case of intra slices, resulting in smaller effective LCU sizes for intra slices. For example, the coding_quadtree( ) syntax structure in ITU-T H.265 may be modified such that the value of syntax element split_cu_flag is inferred be equal to 1 for the LCU root (and for subsequent depths in some examples, e.g., up to depth 2 or until a certain CU/CB size is reached). Table 1 illustrates an example of a syntax modification to the coding_quadtree( ) syntax structure in ITU-T H.265 that may be used in order to enable inferred splitting on an LCU included in an intra slice. In the example, in Table 1, xN, yN, log 2CbSize, and cqtDepth variables indicating a QT split according to I-ITU H.265. It should be noted that example in Table 1 should not be construed to limit the scope the techniques described herein and that there may be various ways to infer splitting at an LCU level based on a slice type.

That is, for example, the techniques described herein are not limit to a particular syntax structure used to indicate QT and BT splits.

TABLE 1

```
coding_quadtree(x0, y0, log2CbSize, cqtDepth){
    if( slice_type == intra && log2CbSize > a threshold corresponding to a size)
       coding_quadtree(x0, y0, log2CbSize−1, cqtDepth+1)
       coding_quadtree(x1, y0, log2CbSize−1, cqtDepth+1)
       coding_quadtree(x0, y1, log2CbSize−1, cqtDepth+1)
       coding_quadtree(x1, y1, log2CbSize−1, cqtDepth+1)
 . . .
```

Figure 12:
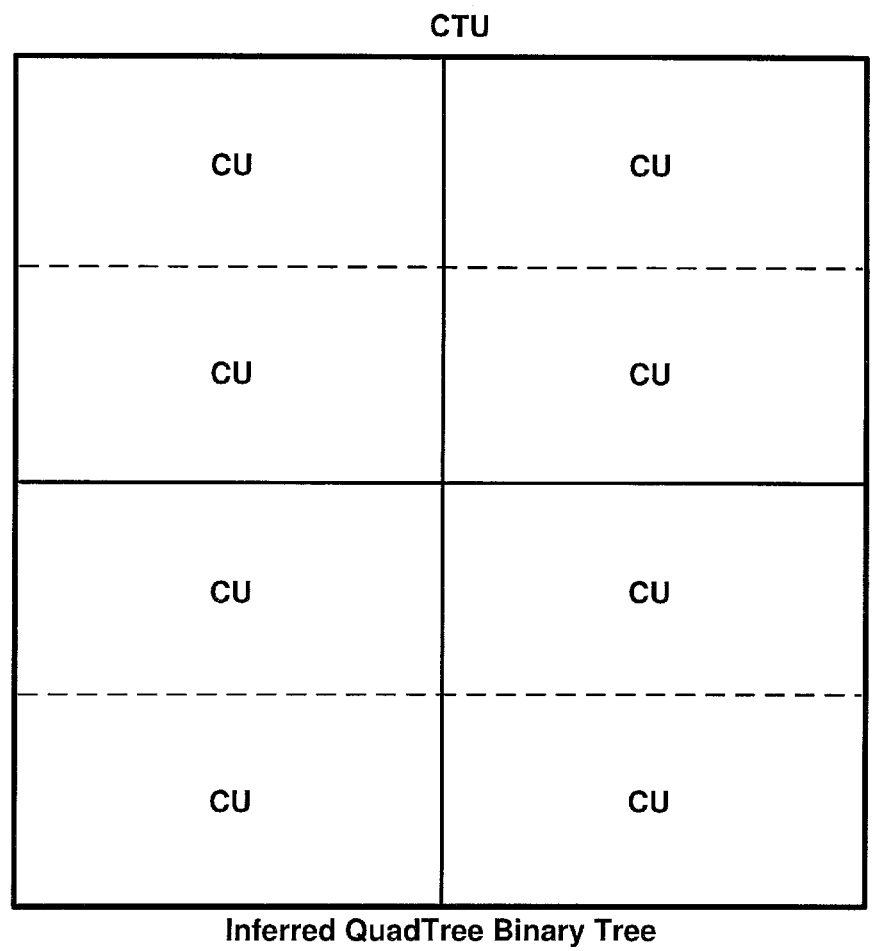
FIG. 12 is a conceptual diagram illustrating an example of an inferred quad tree binary tree in according to one or more techniques of this disclosure.

As described in above, QTBT partitioning as provided in JEM enables CTUs to be partitioned into various rectangular shapes. According to the techniques described herein, in one example, an inferred partitioning of LCUs included in an intra slice may correspond to a specific partitioning geometry. For example, FIG. 12 is a conceptual diagram illustrating an example of an inferred QTBT partitioning of an LCU that may be particular effective for intra prediction. Table 2 provides an example of pseudo syntax that may be used to generate the inferred QTBT partitioning illustrated in FIG. 12. In some examples, inferred partitioning of LCUs included in an intra slice may be signaled using higher level signaling (e.g., SPS, PPS, slice header) and/or based on information associated with previous pictures (or slices thereof).

syntax element in a slice header indicating a number of LCUs included in the slice. For example, in the case where PicA includes a single slice, a syntax element may be included in a slice header indicating that the slice includes 60 LCUs. Further, a slice header may include a flag for each of the 60 LCUs indicating whether the LCU is an intra LCU (e.g., a flag may be a 1-bit syntax element), where the flags correspond to an LCU according to a scan order (e.g., a raster scan). It should be noted that in other examples, instead of signaling a flag for each LCU, techniques such as, run-length or sub-block coding, which are used in video coding to indicate the position significant coefficients in an array of transform coefficients may be used to indicate the position of intra LCUs within a picture and/or within a slice thereof. In another example, rectangular regions in a picture/slice/tile may be identified that use inferred partitioning. Rectangular regions may be signaled by identifying the LCU address of the left-top LCU of the region and the height/

TABLE 2

```
coding_tree(leftTopX, leftTopY, curWidth, curHeight,QTDepth, BTDepth){
    if( slice_type == intra && QTDepth==0 && BTDepth==0 /* at LCU */){
      QT flag = 1;
      coding_tree(leftTopX, leftTopY, curWidth/2, curHeight/2,
          QTDepth+1, BTDepth)
      coding_tree(leftTopX+curWidth/2, leftTopY, curWidth/2, curHeight/2,
          QTDepth+1,BTDepth)
      coding_tree(leftTopX, leftTopY+curHeight/2, curWidth/2, curHeight/2,
          QTDepth+1,BTDepth)
      coding_tree(leftTopX+curWidth/2,leftTopY,curWidth/2, curHeight/2+curHeight/2,
          QTDepth+1, BTDepth)
    }
    if( slice_type == intra && QTDepth==1&& BTDepth==0){
      QT flag = 0, BT split = 2;
      coding_tree(leftTopX,leftTopY,curWidth,curHeight/2,
          QTDepth,BTDepth+1)
      coding_tree(leftTopX,leftTopY+ curHeight/2,curWidth,curHeight/2,
          QTDepth,BTDepth+1)
    }
}
```

Referring again to FIG. 10 and FIG. 11, in some cases, containing the intra region in PicA in intra slices based on slice and tile structure provided in ITU-T H.265 may be less than ideal, as it may result in a relatively large number of slices and/or tiles, thereby increasing slice header overhead. Further, in some cases, coding tools may be restricted such that they are constrained to be applied only within a slice or a tile boundary. In one example, according to the techniques described herein, video encoder 200 may be configured to signal whether an LCU included in an inter slice uses only intra prediction (i.e., whether an LCU is an intra LCU) as such, whether an inferred partitioning should be applied to the LCU. For example, video encoder 200 may be configured to encode PicA in FIG. 9, as a single inter slice (or any combination of inter and/or intra slices), and signal the position of the 12 intra LCUs, such an inferred partitioning may be applied to the 12 intra LCUs. For example, in one example, video encoder 200 may be configured to include a width of the region in LCU's. In another example, rectangular regions that use inferred partitioning may correspond to tiles.

Once an LCU within a inter slice is identified as an intra LCU, an inferred partitioning may be applied to the LCU. For example, the if(slice_type==intra) condition in Table 1 and Table 2 may be replaced with an if(LCU==intra LCU) condition. It should be noted that in some examples, a determination of whether an inferred partitioning should be applied to an LCU may be indicated using one or more syntax elements at the LCU level. For example, the slice_type==intra) condition in Table 2, may be indicated using a flag. In this manner, a one-bit flag may correspond to a particular arbitrary partitioning that may be useful for coding intra LCUs. In some examples, the presence of the flag may be indicated using higher level signalling (e.g., SPS, PPS, slice header). In some examples, one or several possible particular arbitrary partitionings may be signalled using high level syntax, SPS, PPS, and/or slice header. It should be noted that although the techniques herein are described with respect to intra regions of a picture in the examples above, in some cases that techniques described herein may be applied such that different effective LCU sizes and shapes may be used for various types of regions of a picture. For example, it may be desirable to use smaller effective LCU sizes for a sub-picture within a picture (i.e., a so-called picture-in-picture) regardless of whether the sub-picture is coded using intra and/or inter prediction techniques. In this manner, video encoder 200 represents an example of a device configured to determine a largest coding unit size for a picture, determine whether a largest coding unit within a picture is an intra type largest coding unit, and apply a partitioning to the largest coding unit based on whether the largest coding unit is an intra type largest coding unit.

Referring again to FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 8, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode.

Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218.

As illustrated in FIG. 8, inter prediction processing unit 214 may receive reconstructed video block via filter unit 216. Filter unit 216 may be configured to perform filtering techniques, such as, for example, deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Referring again to FIG. 8, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 13:
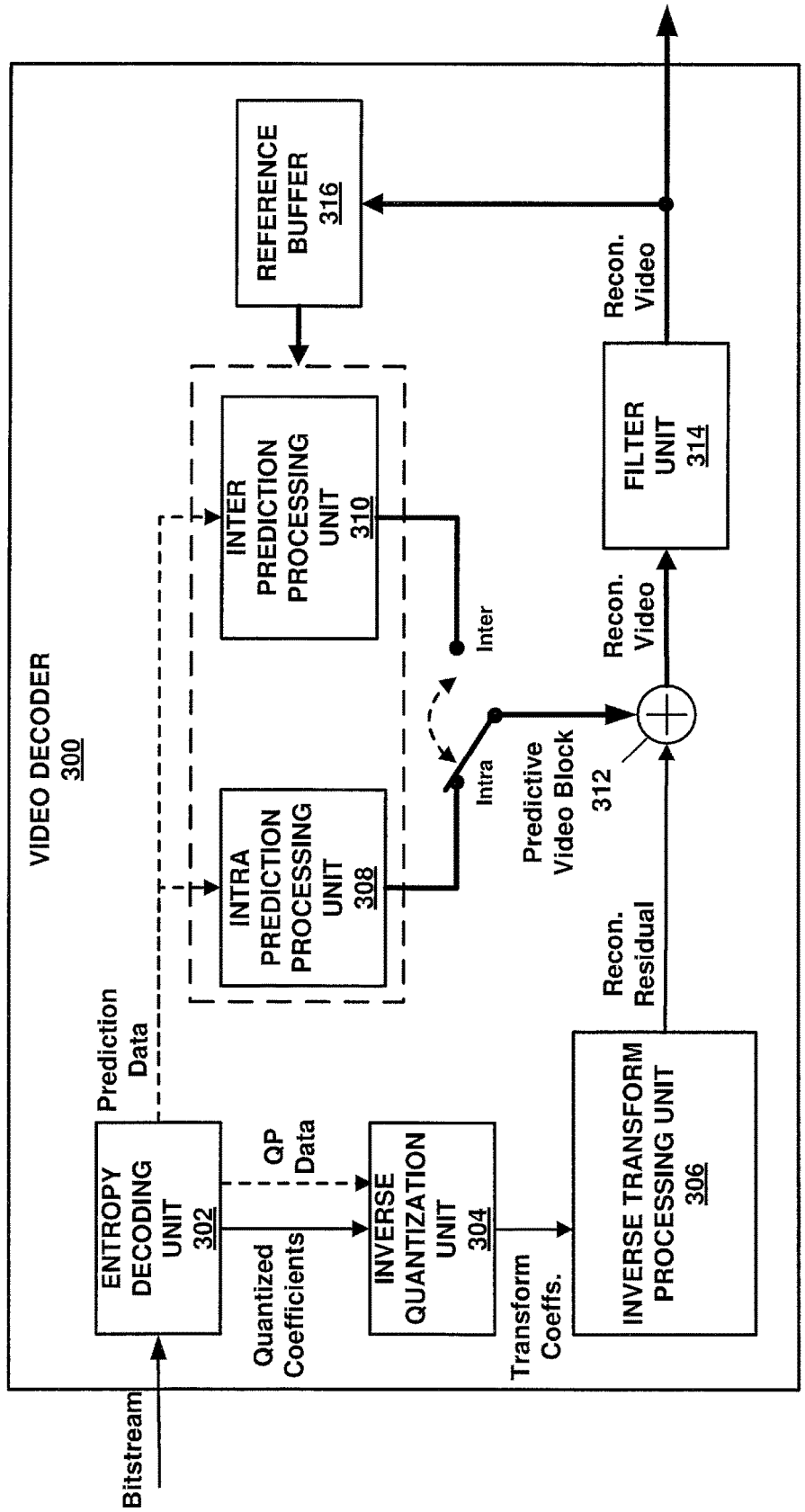
FIG. 13 is a block diagram illustrating an example of a video decoder that may be configured to decode video data according to one or more techniques of this disclosure.

FIG. 13 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 13 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 13, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine a largest coding unit size for a picture, determine whether a largest coding unit within a picture is an intra type largest coding unit, and apply a partitioning to the largest coding unit based on whether the largest coding unit is an intra type largest coding unit based on one or more of the techniques described above for purposes of reconstructing video data. For example, video decoder 300 may be configured to parse syntax elements and/or evaluate properties of video data in order to infer partitionings for intra LCUs.

Referring again to FIG. 13, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 13, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the filter unit 314 may be configured to determine QP values and use them for filtering (e.g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 13, a reconstructed video block may be output by video decoder 300. In this manner, video decoder 300 may be configured to generate reconstructed video data according to one or more of the techniques described herein.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A device for decoding video data, the device comprising one or more processors configured to:
derive a largest coding unit size by using a syntax element indicating a size of a largest coding unit for a luminance component;
derive size variables by using syntax elements in a slice header;
derive possible partitionings for largest coding units included in an I slice by using the size variables;
determine whether the largest coding unit is included in the I slice; and
split the largest coding unit in the I slice based on (i) a determination of whether the largest coding unit is included in the I slice and (ii) a split flag syntax element specified by using one of the possible partitionings.

2. A device for encoding video data, the device comprising one or more processors configured to:
derive a largest coding unit size by using a syntax element indicating a size of a largest coding unit for a luminance component;
derive size variables by using syntax elements in a slice header;
derive possible partitionings for largest coding units included in an I slice by using the size variables;
determine whether the largest coding unit is included in the I slice; and split the largest coding unit in the I slice based on (i) a determination of whether the largest coding unit is included in the I slice and (ii) a split flag syntax element specified by using one of the possible partitionings.

3. A method for decoding video data, the method including:
- deriving a largest coding unit size by using a syntax element indicating a size of a largest coding unit for a luminance component;
- deriving size variables by using syntax elements in a slice header;
- deriving possible partitionings for largest coding units included in an I slice by using the size variables;
- determining whether the largest coding unit is included in the I slice type; and
- splitting the largest coding unit in the I slice based on (i) a determination of whether the largest coding unit is included in the I slice and (ii) a split flag syntax element specified by using one of the possible partitionings.

* * * * *